United States Patent [19]

Haiki

[11] Patent Number: 5,048,491
[45] Date of Patent: Sep. 17, 1991

[54] AUTOMOBILE ENGINE CONTROL APPARATUS

[75] Inventor: Takashi Haiki, Higashihiroshima, Japan

[73] Assignee: Mazda Motor Corporation, Hiroshima, Japan

[21] Appl. No.: 574,683

[22] Filed: Aug. 30, 1990

[30] Foreign Application Priority Data

Aug. 30, 1989 [JP] Japan ................... 1-225935

[51] Int. Cl.⁵ .......................................... F02M 51/00
[52] U.S. Cl. ................................ 123/479; 123/198 D
[58] Field of Search ................ 123/479, 198 D, 486, 123/480, 489; 364/431.04, 431.05, 431.11

[56] References Cited

U.S. PATENT DOCUMENTS

| | | | |
|---|---|---|---|
| 4,797,828 | 1/1989 | Suzuki et al. | 364/431.04 |
| 4,850,324 | 7/1989 | Furuyama | 123/479 |
| 4,879,673 | 11/1989 | Nagase et al. | 123/479 |
| 4,886,028 | 12/1989 | Uchinami et al. | 123/479 |

*Primary Examiner*—Raymond A. Nelli
*Attorney, Agent, or Firm*—Fleit, Jacobson, Cohn, Price, Holman & Stern

[57] ABSTRACT

An engine control apparatus for an internal combustion engine has a plurality of groups of cylinders. The engine control apparatus has the same number of independent intake manifolds as there are groups of cylinders, isolating the groups of cylinders. Each independent intake manifold has an air flow meter. The engine control apparatus provides electronic fuel injectors of each group of cylinders with an injector control signal having a pulse width determined based on a signal from the air flow meter so as to deliver a correct ratio of air-fuel mixture into the group of cylinders. The engine control apparatus detects whether one of the plurality of air flow meters is at fault. If any one of the air flow meters is at fault, the engine control apparatus adjusts the pulse width of an injector control signal to be provided for the fuel injectors of the group of cylinders having the air flow meter which is at fault, based on a signal provided by another of the air flow meters which is working normally.

9 Claims, 5 Drawing Sheets

AUTOMOBILE ENGINE CONTROL APPARATUS

FIELD OF THE INVENTION

The present invention relates to an automobile engine control apparatus, and, more particularly, to a control apparatus for controlling output power of an internal combustion engine based on an output of an air flow meter of an air intake system.

BACKGROUND OF THE INVENTION

For controlling engine power, an air flow meter is typically used to determine an appropriate amount of air flow in an electronically controlled fuel injection system in order to establish an ideal air-to-fuel ratio. The fuel injection system produces a signal, having an appropriate pulse width, by which a fuel injector is controlled so as to open and produce as nearly a perfect air-fuel mixture as possible. Electronically controlled fuel injection systems, such as that described in, for instance, Japanese Unexamined Patent Publication 63-4549, are generally provided with only one air flow meter.

Typical high power engines, having a large number of cylinders, require a large quantity of intake air at high engine power demands. When such a high power engine is controlled by an electronically controlled fuel injection system having only one air flow meter, the air flow meter must detect a wide range of intake air amounts. Under such conditions, the air flow meter has difficulty in making detections over the wide range of intake air amounts without a decrease in detecting accuracy.

High power engines of this kind are typically provided with the same number of independent intake manifolds, each having an air flow meter disposed therein, as there are groups of cylinders, so as to isolate the groups of cylinders from one another. In such a high power engine, since each air flow meter is required to detect, or cover, only a narrow range of intake air amounts, each air flow meter is, accordingly, capable of detecting the amount of incoming intake air with high accuracy. However, if one of these air flow meters is damaged, out of order, or otherwise faulty, the group of cylinders with the air flow meter which is at fault is brought into suspension. This results in the engine creating a pumping loss and, accordingly, brings on a great decrease in engine power.

SUMMARY OF THE INVENTION

It is, therefore, a primary object of the present invention to reduce or eliminate such a pumping loss and corresponding decrease in engine power. Such an object is accomplished by providing an engine control apparatus for an internal combustion engine having a plurality of groups of cylinders isolated by the same number of independent intake manifolds as there are groups of cylinders. Each independent intake manifold has an air flow meter, which controls the engine without decreasing its output power even though any one of the air flow meters is at fault, or out of order. The engine control apparatus provides electronic fuel injectors of each group of cylinders with an injector control signal having a correct pulse width. The correct pulse width is determined from a signal from the air flow meter so as to deliver a correct air-fuel ratio mixture into the group of cylinders. The engine control apparatus detects whether one of the plurality of air flow meters is at fault and, if any one of the air flow meters is at fault, adjusts the pulse width of an injector control signal. The injector control signal having the adjusted pulse width is provided for the electronic fuel injectors of the group of cylinders with the air flow meter which is detected to be at fault, based on a signal provided by the other of the air flow meters which is working normally.

The pulse width injector control signal is adjusted in accordance with the difference between the amounts of intake air introduced through the intake manifolds for the groups of cylinders detected, for every engine demand defined by engine speed and engine load, during normal operation of the air flow meters. In particular, the difference is given as an average difference of a predetermined number of detections of actual differences between the amounts of intake air introduced through the intake manifolds for the groups of cylinders. In place of the amount of intake air introduced through either one of the manifolds with an air flow meter which is judged to be at fault, a product of the average difference and the amount of intake air introduced through the other of the intake manifolds is substituted.

BRIEF DESCRIPTION OF THE DRAWINGS

The above and other objects and features of the present invention will be apparent from the following description of a preferred embodiment, when considered in conjunction with the appended drawings, in which.

DETAILED DESCRIPTION OF THE PREFERRED EMBODIMENT

Figure 1:
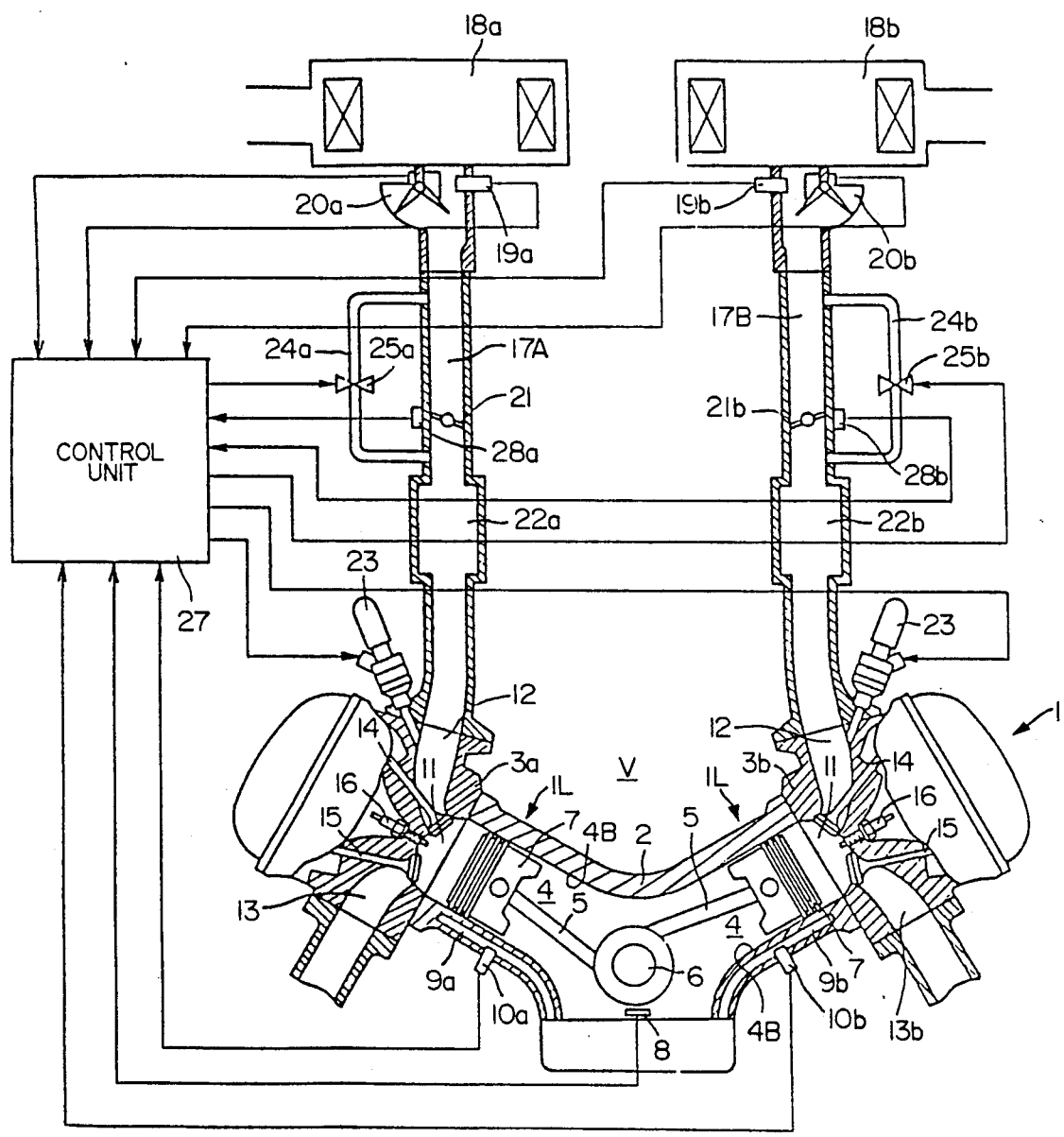
FIG. 1 is a view schematically showing an internal combustion engine provided with an engine control apparatus in accordance with a preferred embodiment of the present invention.

Referring to the drawings in detail, and in particular to FIG. 1, an engine body of a V-type engine, having an electronic fuel injection system in accordance with a preferred embodiment of the present invention, is shown. An engine body 1 includes first, or left, and second, or right, cylinder blocks or banks 1L and 1R, respectively, arranged in a V-formation, with a predetermined relative angle therebetween, for example, a relative angle of about 60 degrees. A plurality of cylinders 4, formed and arranged in a straight line in the left and right cylinder banks 1L and 1R, are divided into two groups. The cylinders 4 in each group are disposed in one and the same cylinder banks 1L or 1R, respectively, so that adjoining cylinders 4 in each cylinder bank 1L or 1R do not fire sequentially, i.e., one after another. The cylinders 4 (one cylinder of each cylinder block or bank is shown in FIG. 1) are, respectively, provided with intake ports 12 having openings which extend toward a V-shaped space V between the cylinder bank 1L and 1R. Further, the cylinders 4 are, respectively, provided with exhaust ports 13 with openings which extend to the sides of the corresponding cylinder banks remote from the V-shaped space V.

The engine 1 has a cylinder block 2 provided with cylinder bores 4B in which pistons 7 can slide. The pistons 7 are connected, or coupled, to a crankshaft 6 by connecting rods 5, respectively. A first or left cylinder head 3a is mounted on the cylinder block 2 and provides for the left cylinder bank 1L, and a second or right cylinder head 3b is mounted on the cylinder block 2 and provides for the right cylinder bank 1R. A speed sensor 8 is disposed in association with the crankshaft 6 to detect the rotational speed of the engine 1 The left and right cylinder heads 3a and 3b are formed with water jackets 9a and 9b, respectively. The water jackets 9a and 9b are provided with temperature sensors 10a and 10b, respectively, to detect the temperature of cooling water. The sensors 8, 10a and 10b are well known in the art, and may be of any known type.

Combustion chambers 11 are formed in the cylinders 4 in the left cylinder bank 1L by the tops of the pistons 7, a lower wall of the left cylinder head 3a and the cylinder bores 4b. Similarly, combustion chambers 11 are formed in the cylinders 4 in the right cylinder bank 1R by the tops of the pistons 7, a lower wall of the right cylinder head 3b and the cylinder bores 4b. The intake port 12 and the exhaust port 13 open into each combustion chamber 11, and are opened and shut at a predetermined timing by an intake valve 14 and an exhaust valve 15, respectively. A spark plug 16 is threaded into each cylinder head and extends into each combustion chamber 11 just the right amount. Each cylinder head 3a and 3b is provided with an injector, or injection nozzle, 23 so as to deliver a controlled amount of fuel into the intake port 12.

Intake air is introduced into the cylinders 4 through first intake passage 17A extending from the intake ports 12 of the left cylinder head 3a or second intake passage 17B extending from the intake ports 12 of the right cylinder head 3b. The first intake passage 17A is provided, at the upstream end thereof, with a first air cleaner 18a, a first intake air temperature sensor 19a, a first air flow sensor or meter 20a and a first throttle valve 21a. Attached to the first throttle valve 21a is a first throttle opening sensor 28a. The first intake passage 17A is formed with a surge tank 22a between the first throttle valve 21a and intake port 12. The first intake passage 17A is further formed with a bypass passage 24a for allowing intake air to bypass the first throttle valve 21a. A valve 25a, serving as an idle speed control valve, and hereinafter referred to an ISC valve, is disposed in the bypass passage 24a to regulate or control the amount of intake air flowing through the bypass passage 24a. The second intake passage 17B has the same structure and function as the first intake passage 17A. That is, the second intake passage 17B is provided, at the upstream end thereof, with a second air cleaner 18b, a second intake air temperature sensor 19b, a second air flow sensor or meter 20b and a second throttle valve 21b. Attached to the second throttle valve 21b is a second throttle opening sensor 28b. The second intake passage 17B is formed with a surge tank 22b between the second throttle valve 21b and intake port 12. The second intake passage 17B is further formed with a bypass passage 24b for allowing intake air to bypass the second throttle valve 21b. An ISC valve 25b is disposed in the bypass passage 24b to regulate or control the amount of intake air flowing through the bypass passage 24b.

To control the injectors 23 and the first and second ISC valve 25a and 25b, the engine 1 has a control unit 27, comprising mainly a microcomputer that constantly monitors engine speed, load, throttle opening or position, temperature, etc. Based on all these incoming signals from the sensors 8, 10a, 10b, 19a, 19b, 20a, 20b, 28a and 28b, the control unit 27 constantly adjusts injector control signal pulse widths so as to deliver a correct air-fuel ratio for any given engine demand. That is, the control unit 27 initially sets a reference control value for the amount of air to be passed or blown through the bypass passages 24a and 24b when it is judged that the operating condition of the engine 1 falls in a predetermined idle operating zone based on engine speed and throttle opening or engine load. The control unit 27, then, corrects the reference control value by using a feedback correction coefficient depending on the deviation of an actual engine speed from a target engine speed, and further makes necessary corrections in the corrected reference control value so as to set an eventual control value. The control unit 27 provides the first and second ISC valves 25a and 25b with a pulse signal representative of the eventual control value so as to allow a correct amount of air to pass through the bypass passages 24a and 24b. The control unit 27 also adjusts the pulse width of a control signal provided for the injectors 23 so as to give a correct amount of fuel to be delivered for any given engine demand.

The control unit 27 monitors the quantitative difference $\Delta Q$ between the amount of intake air QA passing into the first intake passage 17A and the amount of intake air QB passing into the second intake passage 17B, based on incoming signals from the first and second air flow sensors 20a and 20b. The quantitative difference $\Delta Q$ is calculated for different basic pulse widths Tp depending upon engine load and engine speeds N. The quantitative difference $\Delta Q$ is memorized in memory areas defined by engine speed N and pulse width Tp. If either one of the air flow sensors 20a and 20b is abnormally operating or otherwise at fault, the control unit 27 provides the injector 23, associated with the air flow sensor 20a or 20b at fault, with a control signal having a pulse width obtained by making a correction in an incoming signal from the other air flow sensor, which is normally operating, based on a quantitative differencence $\Delta Q$ corresponding to the present engine demand represented by engine speed N and pulse width Tp. For this purpose, the control unit 27 has a first map memory for memorizing the quantitative difference $\Delta Q$ and a second map memory for memorizing a learned quantitative difference $\Delta QL$ calculated from a specific number of, for example five, measurements of quantitative difference $\Delta Q$ for each engine demand.

Figures 2, 2A:
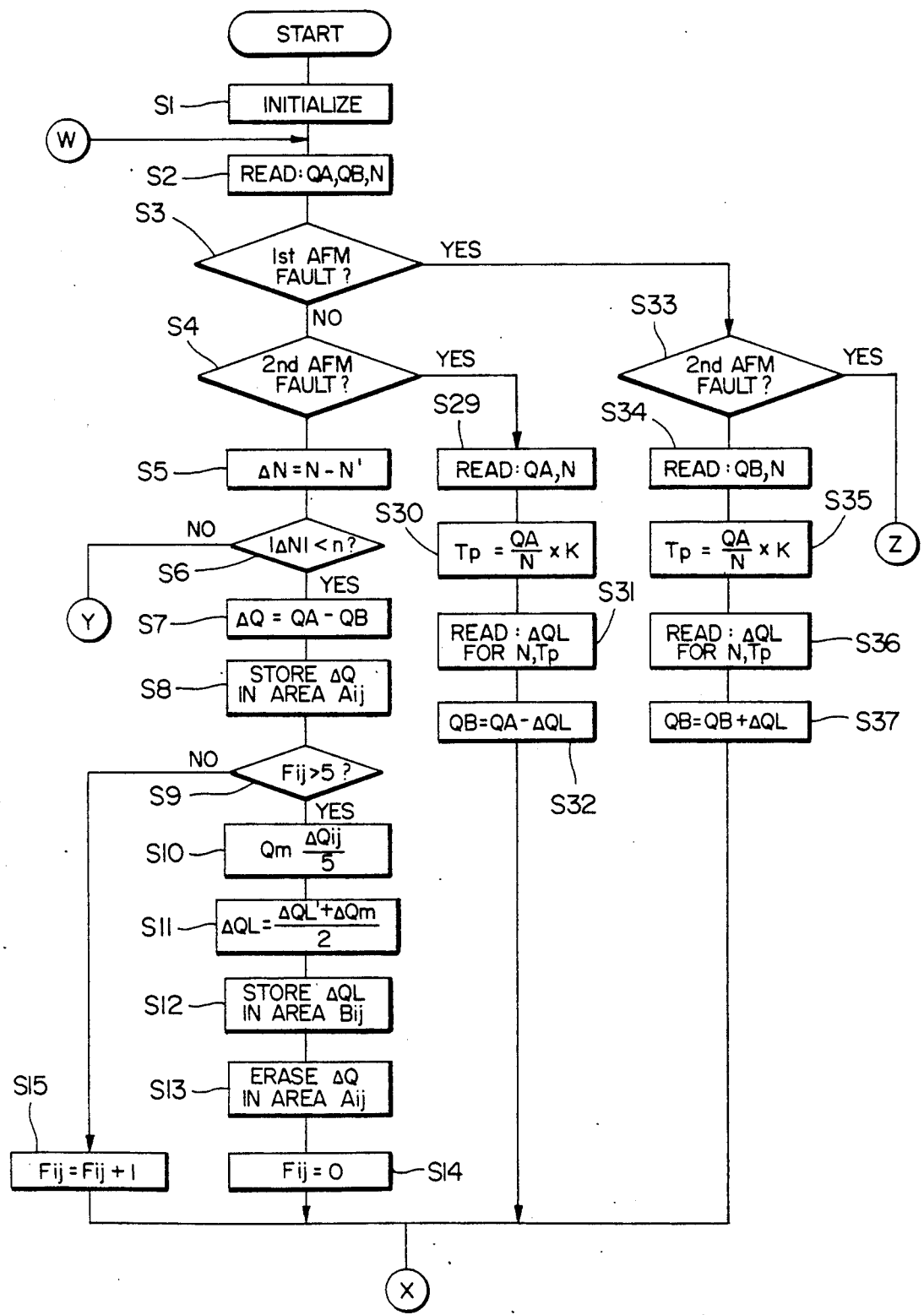
FIGS. 2, 2A and 2B are flow charts illustrating an engine control sequence.
Figure 2B:
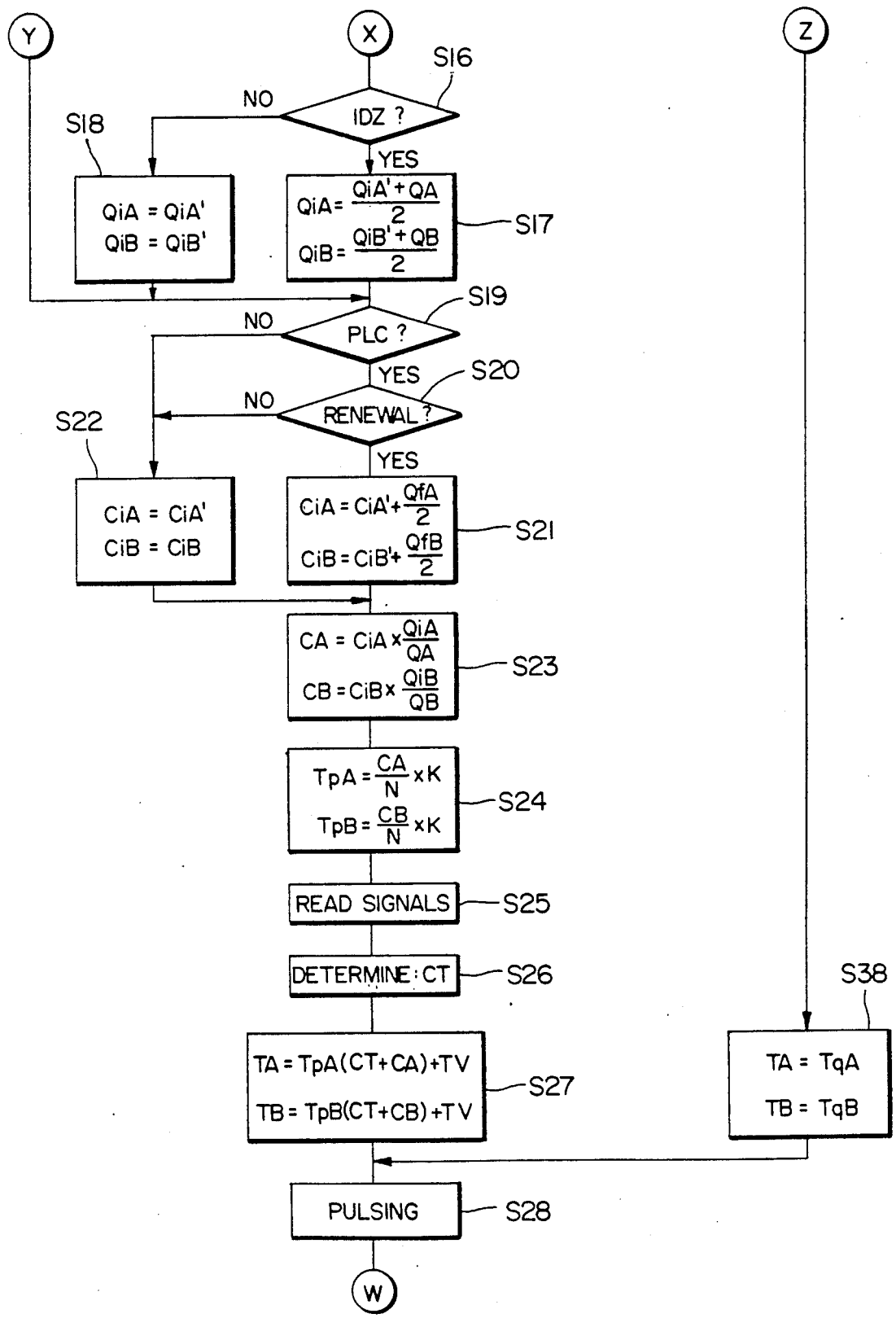

The operation of the intake air control system of the engine control apparatus depicted in FIG. 1 is best understood by reviewing FIGS. 2 to 4, which are flow charts illustrating a general or main sequence routine and subroutines for the microcomputer of the control unit 27. Programming a computer is a skill well understood in the art. The following description is written to enable a programmer having ordinarily skill in the art to prepare an appropriate program for the microcomputer of the control unit 27. The particular details of any such program would, of course, depend upon the architecture of the particular computer selected.

Figure 4A:
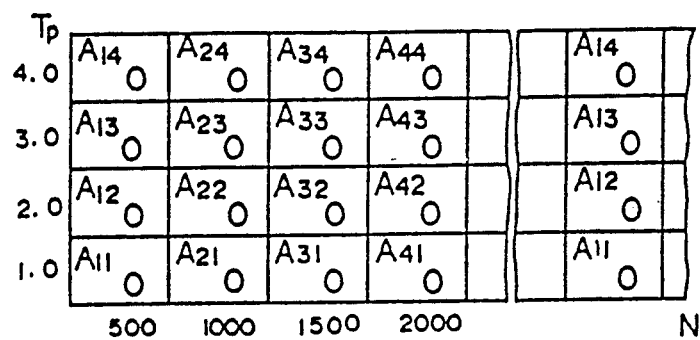
FIGS. 4A and 4B are tables showing a first map memory.
Figure 4B:
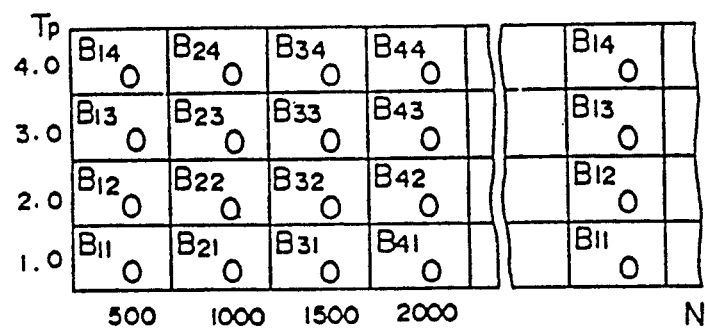
Figure 5:
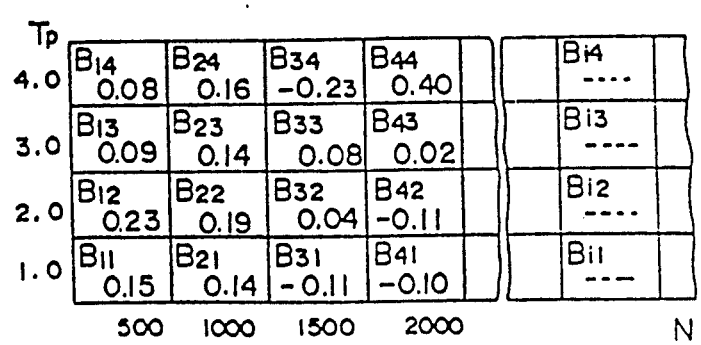
FIG. 5 is a table showing a second map memory.

When the intake air control sequence starts, the microcomputer initializes itself at step S1 to clear all of memory areas Aij and Bij (i=1, 2, 3, ..., m; j=1, 2, 3, 4) of the first and second map memories and set initial value of zero (0), as shown in FIGS. 4A and 4B.

After initialization, the control unit 27 reads signals from the first and second air flow meters 20a and 20b and the speed sensor 8 at step S2 and executes a fault detection, at step S3, to judge whether the first air flow sensor (1st AFM) 20a is at fault.

Figure 3A:
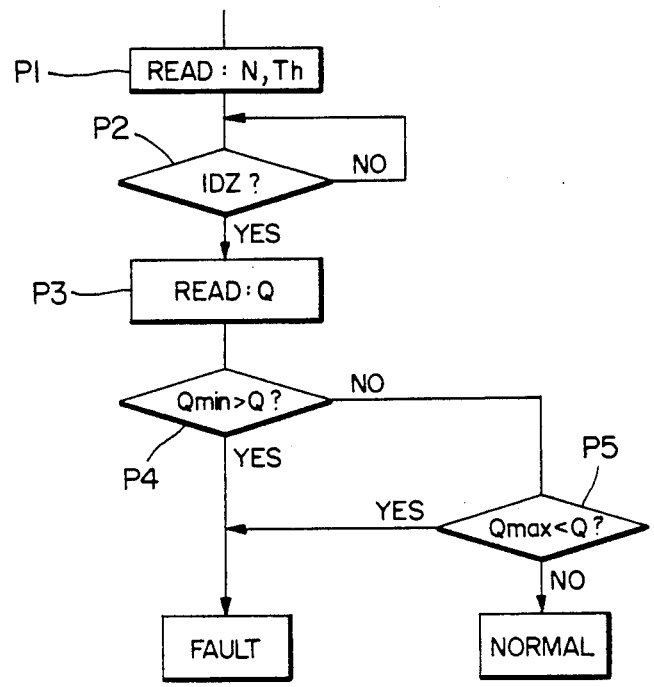
FIG. 3A is a flow chart illustrating an example of the fault decision making sequence for an air flow meter.

Referring to FIG. 3A, showing a flow chart of the fault detection sequence, the first step P1 is to read signals N and Th, representative of engine speed and throttle opening, respectively, from the speed sensor 8 and the first throttle opening sensor 28a. Then, a decision is made at step P2 to judge whether the engine 1 is operated in an idle zone (IDZ). It is to be noted that the idle zone (IDZ) is defined in a conventional manner, i.e., is determined to exist when the detected engine speed and engine load are lower than a particular engine speed and a particular engine load, respectively. The idle zone and is known to as exist in what is referred to as a feedback fuel control zone. If the engine 1 is operated in the idle zone (IDZ), after reading a signal, representative of the amount of intake air QA in the first intake passage 17A, from the first air flow sensor 20a at step P3, a decision is made at step P4 to judge whether the amount of intake air QA is smaller than a predetermined minimum amount Qmin. If the answer to the decision at step P4 is yes, then, the first air flow sensor 20a is judged to be at fault. However, if the answer to the decision at step P4 is no, another decision is made at step P5 to judge whether the amount of intake air QA is larger than a predetermined maximum amount Qmax. The first air flow sensor 20a is judged to be at fault if the answer to the decision at step P4 is yes or normally operating if the answer to the decision at step P4 is no. If in fact the first air flow sensor 20a is judged to be normally operating, the control unit 27 executes a fault detection subroutine, at step S3, to judge whether the second air flow sensor 20b is at fault. For this judgement, the same fault detection sequence shown in FIG. 3A is executed regarding the amount of intake air QB in the second intake passage 17B. As long as it provides a normal signal, i.e., one which is representative of an amount of intake air QA between the predetermined limit values Qmin and Qmax, the first or second air flow sensor is judged to be normally operating.

The control unit 27 proceeds to step S5 to calculate a speed change $\Delta N$ in order to decide whether the engine 1 is stable in operating speed at step S6. The engine 1 is judged to be stable in operating speed if the speed change $\Delta N$ is smaller than a critical value n. If the engine 1 is stable, the quantitative difference $\Delta Q$ is calculated at step S7 and is added to a previously memorized quantitative difference in a specific area Aij of the first map memory which is allocated to the operating engine speed and basic pulse width Tp, at step S8.

After adding and memorizing the quantitative difference $\Delta Q$, the control unit 27 proceeds to step S9 to count the number, i.e., frequency of quantitative difference additions Fij which have been summed in a particular memory area Aij, which corresponds to a particular engine operating condition, of the first memory map. The control unit detects whether or not a particular memory area Aij has memorized at least a predetermined number of quantitative differences, for instance five (5). Then, after calculating a mean difference $\Delta Qm$ of five quantitative differences $\Delta Qij$ in the memory area Aij at step S10, a latest learning value of a quantitative difference $\Delta QL$ is calculated. The latest learning value of the automobile difference $\Delta QL$ is calculated from the arithmetical mean or average of the learning value of quantitative difference $\Delta QL'$ previously stored in the corresponding memory area Bij of the second map memory and the mean quantitative difference $\Delta Qm$ stored in the memory area Aij of the first map memory at step S11. The previous learning value of quantitative difference $\Delta QL'$ in the memory area Bij is replaced with the latest learning value of quantitative difference $\Delta QL$ at step S12. Immediately after the replacement or renewal of the learning value in the memory area Bij, the control unit 27 clears the memory area Aij of the first map memory to erase the data of the quantitative difference $\Delta Q$ and the numbers of additions Fij at step S13 and S14, respectively.

If the answer to the decision at step S9 is no, this indicates that the frequency of additions Fij which have been made to a particular memory area Aij of the first map memory is less than the predetermined frequency. The addition frequency Fij is changed by one increment for the particular memory area Aij, at step S15.

After step S14 or step S15, the control unit 27 proceeds to step S16 to make a decision as to whether the engine 1 is operated in a condition falling in the idle zone (IDZ). If the answer to the decision at step S16 is yes, an amount of idling intake air QiA or QiB, to be introduced into each intake passage 17A or 17B, is obtained as an arithmetic mean of the latest amount of intake air QA or QB and the previous amount of idling intake air QiA' or QiB', respectively, at step S17. On the other hand, if the answer to the decision at step S16 is no, the previous amount of idling intake air QiA' or QiB' is taken as the amount of idling intake air QiA or QiB, respectively, at step S18. In any event, after determining the amount of idling intake air QiA and QiB, the control unit 27 executes a learning condition judging subroutine, at step S19, to judge whether a predetermined learning condition (PLC) for fuel injection has been satisfied.

Figure 3B:
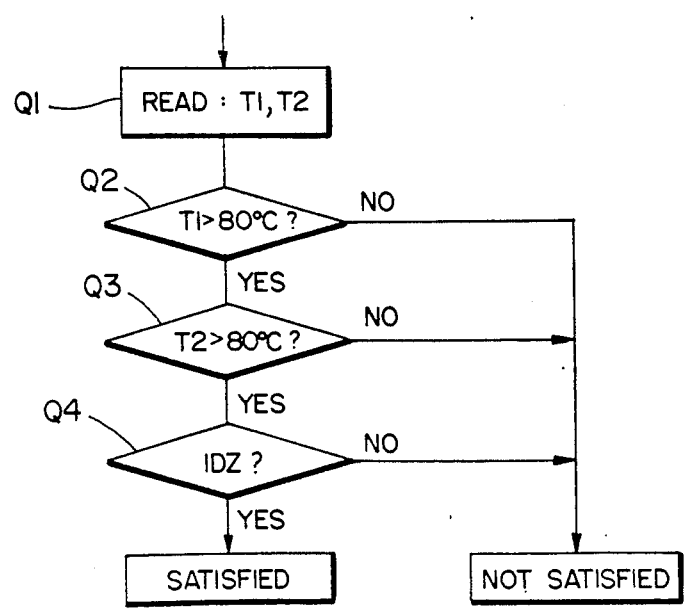
FIG. 3B is a flow chart illustrating an example of the learning condition decision making sequence.

Referring to FIG. 3B illustrating a flow chart of the learning condition judging sequence, the first step Q1 is to read signals, representative of temperatures T1 and T2, from the temperature sensors 10a and 10b provided in the water jackets 9a and 9b of the left and right cylinder heads 3a and 3b, respectively. The temperatures T1 and T2 are compared with a predetermined critical temperature of cooling water, for instance about 80 degrees Celsius, at steps Q2 and Q3. If the cooling water in both the left and right cylinder heads 3a and 3b have temperatures higher than the predetermined critical temperature of 80 degrees, then another decision is made to judge whether the engine 1 is operated in the idle zone (IDZ). If the engine 1 is operated in the idle zone (IDZ) in the feedback fuel control zone, it is judged that the predetermined learning condition for fuel injection has been satisfied. If any one of answers to the decisions made at steps Q2, Q3 and Q4 is no, it is judged that the predetermined learning condition for fuel injection has not yet been satisfied.

Referring back to FIG. 2, when the predetermined learning condition for fuel injection is satisfied, a decision regarding the renewal of learning correction factors is made at step S20. For renewing the learning correction factors CLA and CLB, it is necessary that the routine be continually repeated more than a predetermined number of times, for instance 32 times. This means that 32 consecutive feedback fuel control values should be sampled in order to determine the learning correction factors with sufficient accuracy. The learning correction factors CiA and CiB are obtained by carrying out calculations at steps S21 and S23, if the predetermined number of repetitions of the routine has occurred, or by carrying out calculations at steps S22 and S23, if the predetermined number of repetitions of the routine has not yet occurred. At step S21, or when the predetermined learning condition for fuel injection is not yet satisfied, idle learning correction coefficients CiA and CiB are calculated by adding half values of mean feedback correction coefficients Cfa and Cfb to the previous idle learning correction coefficients CiA' and CiB', respectively. However, at step S22, the idle learning correction coefficients CiA and CiB take the previous idle learning correction coefficients CiA' and CiB', respectively. Then, at step S23, the learning correction factor CA is calculated as a product of the idle learning correction coefficients CiA, obtained at step S21 or step S22, and the ratio of the amount of idle intake air QiA to the amount of intake air QA. Also, at step S23, the learning correction factor CB is calculated as a product of the idle learning correction coefficients CiB, obtained at step S21 or step S22, and the ratio of the amount of idle intake air QiB to the amount of intake air QB.

After the determination of the learning correction factors CA and CB at step S23, basic fuel injection pulse widths TpA and TpB are calculated, based on the learning correction factors CA and CB and engine speed, respectively, at step S24. The control unit 27 proceeds to step S25 to read signals, and then to step S26 to determine another necessary correction coefficient CT based on the signals which have been read in step S26. At step S27, calculations are made to determine the eventual pulse widths TA and TB for injectors 23 of the left and right cylinder banks 1L and 1R, respectively. Finally, the control unit 27 provides the injectors 23 of the left and right cylinder banks 1L and 1R with fuel injection control signals having the eventual pulse widths TA and TB, respectively, at step S28, so as to deliver a correct air-fuel ratio for the given engine demand.

These steps S2 through S28 are repeated until any one of the air flow sensors 20a and 20b is judged to be at fault. Before fault is detected, every learning quantitative difference ΔQi, which is obtained based on five quantitative differences ΔQ for each specified engine demand defined by engine speed N and injector pulse width Tp, is stored in a corresponding memory area of the second map memory, an example of which is represented in FIG. 6.

As a result of decision at step S4, if it is found that the second air flow sensor 20b is at fault, the control unit 27 switches to step S29 to read the engine speed N and the amount of intake air QA in the first intake passage 17A. The control unit 27, after calculating a basic injector pulse width Tp, at step 30, based on the engine speed N and the amount of intake air QA read at step S29, reads out the learning quantitative difference ΔQL from a memory area Bij of the second map memory according to the engine speed N and the basic injector pulse width Tp at step S31. Then, at step S32, the control unit 27 calculates the difference between the amount of intake air QA and the learning quantitative difference ΔQi and substitutes the difference for the amount of incoming intake air QB in the first intake passage 17B. Accordingly, the basic fuel injection pulse width TpB for the injector 23 of the right cylinder bank 1R is determined, depending upon a signal representative of the amount of incoming intake air QA, provided from the normally operating air flow sensor, namely the first air flow sensor 20a. Thereafter, the control unit 27 undergoes steps S16 through S28.

If it is found, at step S3, that the first air flow sensor 20a is at fault, the control unit 27 switches to step S33 to judge whether the second air flow sensor 20a is at fault. This judgement is made by the same subroutine performed at step S4 and need not be repeated. The control unit 27, if finding that the second air flow sensor 20b is not at fault, reads the engine speed N and the amount of intake air QB in the second intake passage 17B, at step S34. The control unit 27, after calculating a basic injector pulse width Tp, at step 35, based on the engine speed N and the amount of intake air QB read at step S34, reads the learning quantitative difference ΔQi from a memory area Bij of the second memory map according to the engine speed N and the basic injector pulse width at step S36. Then, at step S37, the control unit 27 calculates the sum of the amount of intake air QB and the learning quantitative difference ΔQi and substitutes the sum for the amount of incoming intake air QA in the first intake passage 17A. Accordingly, the basic fuel injection pulse width TpA for the injector 23 of the left cylinder bank 1L is determined, depending upon a signal representative of the amount of incoming intake air QB, provided from the normally operating air flow sensor, namely the second air flow sensor 20b. Thereafter, the control unit 27 undergoes steps S16 through S28.

The control unit 27, if finding that the second air flow sensor 20a, in addition to the first air flow meter 20a, is at fault, switches to step S38 to substitute backup pulse widths TqA and TqB for the eventual pulse widths TA and TB, respectively. Then, the control unit 27 provides the injectors 23 of the left and right cylinder banks 1L and 1R with fuel injection control signals having the backup pulse widths TA and TB, respectively, at step S28.

The foregoing is to be considered as only illustrative of a preferred embodiment of the invention. Various modifications to and equivalents of the invention as described may occur to those skilled in the art. The following claims are intended to encompass any such modifications and equivalents.

What is claimed is:

1. An engine control apparatus for an internal combustion engine which has a plurality of cylinders in two groups and an electronic fuel injector provided for each of said cylinders, comprising:

manifold means provided for each group of cylinders;
 a pair of air flow meters for sensing an amount of intake air introduced into said internal combustion engine through each of said manifold means to provide a signal representative of said amount of intake air;
 control means for providing each of said electronic fuel injectors with an injector control signal, said injector control signal determining the amount of fuel delivered by said injectors, based on said signal representative of said amount of intake air, so as to deliver a mixture having a correct ratio of air to fuel into each of said groups of cylinders;
 fault detecting means for detecting if either one of said air flow meters is at fault; and
 control signal adjusting means for adjusting said injector control signal and providing an adjusted control signal;

wherein when said fault detecting means detects that one of said air flow meters is at fault, said adjusted control signal is provided to cylinders in one of said groups associated with said one of said air flow meters based on said signal provided by the other of said air flow meters.

2. An engine control system as defined in claim 1, wherein said control signal adjusting means adjusts said injector control signal based on the difference between amounts of intake air introduced through said manifold means to each of said two groups of cylinders detected during normal operation of said air flow meters.

3. An engine control system as defined in claim ..2, wherein said difference is detected for every engine demand defined by engine speed and engine load.

4. An engine control system as defined in claim 3, wherein said engine load is represented by predetermined basic pulse widths of said injector control signal.

5. An engine control system as defined in claim 2, wherein said difference is an average of a predetermined number of actual differences between said amounts of intake air introduced through said manifold means to each of said two groups of cylinders.

6. An engine control system as defined in claim 5, wherein the amount of intake air introduced through one of said manifold means, having said one of said air flow meters which is at fault, is replaced by a product of said average and the amount of intake air introduced through the other of said manifolds.

7. An engine control system as defined in claim 6, wherein said control signal adjusting means includes first and second memories having memory areas defined by predetermined engine speeds and predetermined basic injector pulse widths, said first memory additively storing data representative of said actual differences measured at said predetermined engine speeds and predetermined injector pulse widths, said second memory storing data representative of said average in memory areas corresponding to memory areas of said first memory in which said data is additively stored.

8. An engine control system as defined in claim 2, wherein said difference is measured in a particular engine operating condition.

9. An engine control system as defined in claim 8, wherein said particular engine operating condition is in an engine idling zone defined by a particular engine speed and engine load.

* * * * *